United States Patent [19]
Shigyo et al.

[11] Patent Number: 5,173,100
[45] Date of Patent: Dec. 22, 1992

[54] MOLDING METHOD FOR OPTICAL ELEMENT

[75] Inventors: Isamu Shigyo, Chiba; Masaki Ohmori, Kawasaki; Fumitaka Yoshimura, Yokohama, all of Japan

[73] Assignee: Canon Kabushiki Kaisha, Tokyo, Japan

[21] Appl. No.: 697,901

[22] Filed: Apr. 29, 1991

Related U.S. Application Data

[63] Continuation of Ser. No. 437,208, Nov. 16, 1989, abandoned.

[30] Foreign Application Priority Data

Nov. 16, 1988 [JP] Japan .................. 63-287849
Jan. 19, 1989 [JP] Japan ...................... 1-8551

[51] Int. Cl.$^5$ .................................. C03B 23/00
[52] U.S. Cl. ...................... 65/102; 425/808; 65/111; 65/286; 65/64; 65/39; 65/85
[58] Field of Search ............ 65/18.1, 39, 64, 85, 65/102, 111, 275, 286; 425/808; 264/1.2, 2.3, 2.7

[56] References Cited

U.S. PATENT DOCUMENTS

| | | | |
|---|---|---|---|
| 3,900,328 | 8/1975 | Parsons et al. | 65/68 |
| 4,481,023 | 11/1984 | Marechal et al. | 65/64 |
| 4,629,489 | 12/1986 | Hirota et al. | 65/102 |
| 4,778,505 | 10/1988 | Hirota et al. | 65/286 |

FOREIGN PATENT DOCUMENTS

| | | |
|---|---|---|
| 3443607 | 6/1985 | Fed. Rep. of Germany .......... 65/64 |
| 58-84134 | 5/1983 | Japan . |
| 60-145919 | 8/1985 | Japan . |
| 61-53126 | 3/1986 | Japan . |
| 63-182223 | 7/1989 | Japan . |

*Primary Examiner*—Kenneth M. Schor
*Assistant Examiner*—John J. Bruckner
*Attorney, Agent, or Firm*—Fitzpatrick, Cella, Harper & Scinto

[57] ABSTRACT

A method of molding an optical element by pressing glass material uses a cavity composed of a pair of mold members and a side mold member. Either or both of the pair of mold members are rendered slidable along the axial direction of the optical element within the side mold member used during the pressurized molding operation, so that the pair of mold members move in close contact with the contracting glass along the axial direction in the side mold member, during the cooling subsequent to the pressurized molding due to adhesion between the contracting glass and either or both of the pair of mold members. The contraction of the glass during the cooling phase is limited by the adhesive force between the glass and the mold members when at least one of the pair of mold members traverses a gap and reaches a limit of travel; thus tension will be created in the glass.

7 Claims, 7 Drawing Sheets

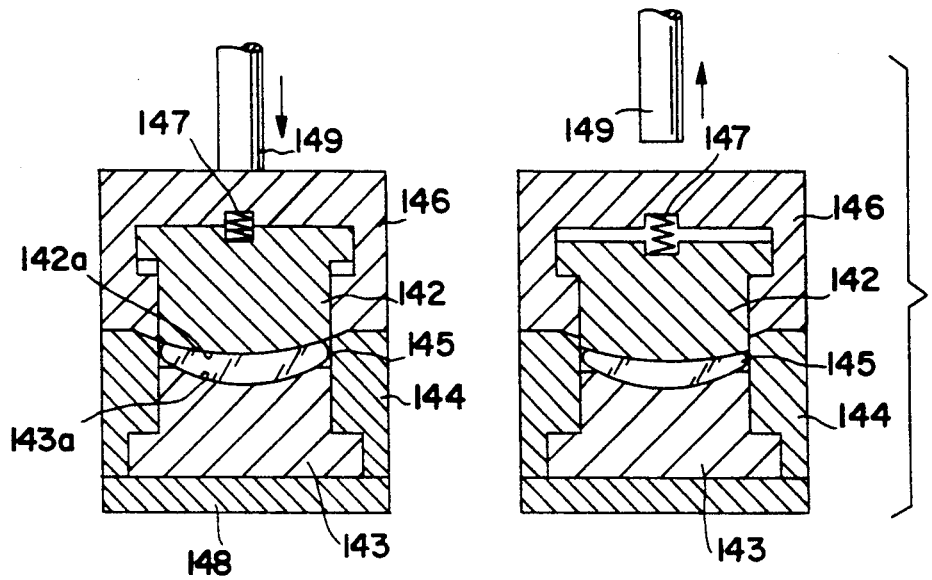
FIG.9(a)  FIG.9(b)
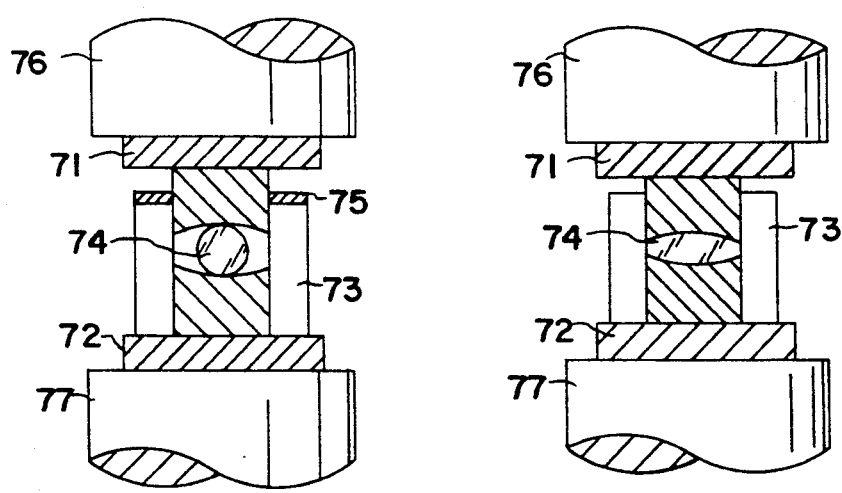
FIG.10(a)
PRIOR ART
FIG.10(b)
PRIOR ART

MOLDING METHOD FOR OPTICAL ELEMENT

This application is a continuation of application Ser. No. 437,208, filed Nov. 16, 1989, now abandoned.

BACKGROUND OF THE INVENTION

1. Field of the Invention

The present invention relates to a molding method for forming an optical element, such as a glass lens for use in an optical instrument, by precision glass molding.

2. Related Background Art

In recent years there have been made attempts to form an optical element, such as of optical glass, by molding only, without a grinding process. For this purpose most efficient is a method of pouring molten glass material into a mold and forming said glass material by pressurized molding, but such method is not suitable for precision glass molding because of the difficulty in controlling the glass contraction at cooling. For this reason there is generally employed a method of forming the glass material into a predetermined form in advance and molding said glass material under pressure and under heating between mold members, as disclosed, for example, in the Japanese Laid-open Patent Sho 58-84134.

In order to obtain a highly precise molded glass product in such method, the form of the molding face of the mold member has to be accurately transferred to the glass material, and, for this purpose, it is particularly important that the molding face of the mold member remain in close contact with the glass material in the course of cooling after the deformation of the glass material. For achieving such close contact, the Japanese Laid-open Patent Sho 60-145919 discloses a method of employing a space defining member of a larger thermal expansion than that of the glass material between the upper and lower mold members.

In the following there will be explained the above-mentioned conventional molding method, with reference to the attached drawings.

FIG. 11 is a schematic cross-sectional view of molding a lens with glass material by the above-mentioned conventional method.

There are shown a molded lens 44; a pair of mold members 41, 42 (upper mold 41 and lower mold 42); a space defining member 43; and a support member 45. After the glass material is supported by the support member 45 and heated close to the softening point of the glass material by a suitable method, said glass material is placed between the upper mold 41 and the lower mold 42, and is pressure molded by an unrepresented pressurizing mechanism. In the cooling step after the molding, contraction occurs in all the members including the molds and the lens. If the space defining member 43 is composed of an ordinary material in the structure shown in FIG. 11, the pressure of the upper and lower molds 41, 42 is not effectively transmitted to the lens 44 since the contraction of glass is larger than that of other members. However this drawback can be avoided by composing the space defining member 43 with a material of a larger thermal expansion than that of the lens 44 and precisely controlling the cooling of said member 43. By maintaining the pressurized state at least to the distortion point of the glass material after the molding step, precisely measuring the temperature of the space defining member and terminating said pressurized state at a predetermined temperature of the space defining member, the glass material is given sufficient pressure from the molding faces of the upper and lower molds 41, 42 to achieve precise transfer of the form of said molding faces, as the space defining member contracts more than the glass material.

However, since such pressurized molding of glass showing thermal expansion is conducted at a temperature at least equal to the yield point or transition point of the glass and since the mold members and the glass show different contacting behaviors as explained above, it is necessary to precisely control the glass contraction at the cooling after molding and to slowly cool the mold members and the molded glass in the prolonged pressurized state.

In addition to the foregoing conventional technology, the Japanese Laid-open Patent Sho 63-182223 discloses a method of maintaining the molding faces of mold members in close contact with the molded glass product in the course of cooling after the molding.

The mechanism employed therein includes, as shown in FIG. 10, an upper mold 71, a lower mold 72, a side mold 73, pressurizing means 76, 77 for pressing said upper and lower molds, and a spacer 75 positioned at the upper end of said side mold 73. The pressurized molding in the above-explained molding apparatus is conducted by placing a glass material 74 between the upper and lower molds 71, 72 and pressurizing the upper and lower molds 71, 72 by the pressurizing means 76, 77 with the spacer 75 on the side mold 73. Then, in preparation for the contraction of glass in the course of cooling, the spacer 75 is eliminated immediately before the cooling and the upper and lower molds 71, 72 are pressurized by the pressurizing means 76, 77 whereby the upper and lower molds 76, 77 can be maintained in close contact with the glass material 74 in the course of said cooling.

However, in the above-explained apparatus in which the contraction of glass is compensated by the thickness of the spacer 75, it is difficult to achieve exact compensation by such spacer 75, since the actual contraction of glass takes place in the order of microns.

Also such methods require a long molding time for achieving precise control of the temperature of the space control member in order to realize precise transfer of the form of the optical face, since the glass undergoes special thermal expansion as explained below.

FIG. 12 illustrates the behavior of thermal expansion of glass, wherein curve a indicates thermal expansion of glass, while curve b indicates that of metal for comparison.

As shown in FIG. 12, glass expands almost linearly as the function of temperature up to the glass transition point, but shows a several times larger expansion beyond said glass transition point. Then, beyond the deformation point, the thermal expansion becomes even larger, but the apparent expansion is no longer observed because the glass starts deformation.

Since the pressurized molding of glass showing above-explained thermal expansion takes place at a temperature above the deformation point or the transition point, and since the molds and the glass show different behaviors of contraction as explained above, it is necessary to precisely control the contraction of glass and to realize gradual cooling by maintaining the molds and the glass in the pressurized state for a long period in the course of cooling after molding.

SUMMARY OF THE INVENTION

In consideration of the foregoing, an object of the present invention is to provide a method capable of facilitating the temperature control of the molds and to mold a highly precise optical element within a short time.

The above-mentioned object can be attained, according to the present invention, by a method of molding an optical element by pressing glass material in a cavity composed of a pair of mold members and a side mold member, wherein either or both of said mold members are rendered slidable in said side mold member in the axial direction of the optical member regardless of the pressurized molding operation, so that said mold members move in close contact with the glass material in the axial direction in said side mold member, at the cooling subsequent to the pressurized molding, following the contraction of the glass material in the course of cooling owing to the adhesive force between the glass and the mold members.

A second object of the present invention is to provide a molding apparatus enabling the movement of glass and mold members, relying on the adhesive force generated between said mold members and said glass, thereby obtaining a highly precise optical element.

The above-mentioned second object can be attained by a molding apparatus provided with means for generating a biasing force for moving the mold members according to the contraction of glass, in order to facilitate the above-mentioned movement of glass and mold members.

Still another object of the present invention is to provide a molding apparatus capable of providing a biasing force, for moving said mold members according to the contraction of glass, at a suitable position of the molding apparatus.

Still another object of the present invention is to provide a molding apparatus equipped with control means for precisely controlling second pressurizing means for moving an upper mold or a lower mold according to the contraction of glass, generated in the course of cooling after molding of said glass material with said upper and lower molds.

BRIEF DESCRIPTION OF THE DRAWINGS

FIGS. 6 to 9 illustrate a second embodiment, wherein:

FIG. 7 is a schematic plan view of an entire apparatus employing the molds shown in FIG. 6;

FIGS. 9(a) and (b) are cross-sectional views showing another embodiment of the present invention;

FIGS. 10(a) and (b) are cross-sectional views of conventional molds;

DETAILED DESCRIPTION OF THE PREFERRED EMBODIMENTS

Figure 1:
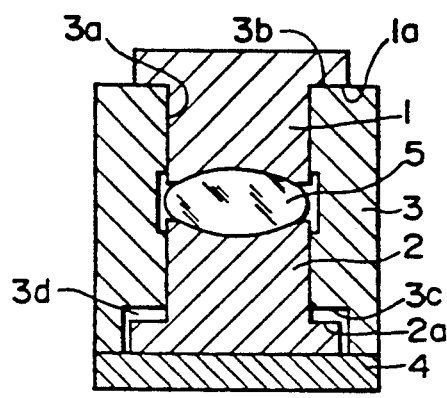
FIG. 1 is a schematic cross-sectional view of a first embodiment of the molds embodying the molding method of the present invention.

As explained in the foregoing, the press molding of glass takes place in a heated state above the deformation point or the transition point of the glass, and the glass contracts more than the molds in the course of subsequent cooling. Consequently the molded faces of the glass are cooled in a state separated from the molding faces of the molds, and solidifies with the formation of uneven faces, without satisfactory transfer of the shape of said molding faces. Such glass contraction occurs Particularly in the course of cooling from the deformation point to the transition point of glass. It is therefore possible to prevent such uneven contraction in the molded faces of the glass, by maintaining the molding faces of the molds in close contact with said molded faces of glass at least from the start of cooling after the press molding to the transition point, namely while the glass viscosity remains in a range of $10^9$ to $10^{13}$ poise.

The present inventors have confirmed that the molding faces of molds adhere to the glass and follow the contraction thereof if the heated glass is cooled after it is pressed by the molds. Said adhesion of glass to the molds is so strong that the mold member can be lifted together with the glass.

According to the present invention, either or both of the paired molds are rendered movable, in a side mold, in the axial direction of the glass in the course of cooling after the press molding. In such structure in which for example the upper mold is rendered movable, said upper mold moves downwards, following the contraction of glass, in close contact with the upper molded face of glass in the course of cooling after the press molding. The lower mold is maintained in close contact with the lower molded face of glass, so that the molded faces of the glass are subjected to satisfactory transfer of the form of the molding faces of the molds and solidify without uneven contraction. On the other hand, if the lower mold is rendered movable in the side mold, said lower mold moves upwards, following the contraction of glass, in close contact with the lower molded face of the glass. The upper mold is maintained in close contact with the upper molded face of the glass, so that the molded faces of the glass solidify without uneven contraction.

In this manner the present invention is able to constantly maintain the molding faces of the upper and lower molds in close contact with the molded faces of the molded article, thus realizing satisfactory transfer of the form of said molding faces, by moving either or both of the molds for forming the molded faces of the molded article in the axial direction in the side mold, following the contraction of glass resulting in the course of cooling after the press molding, by means of the adhesive force between the glass and the molds in a viscosity range of glass from $10^9$ to $10^{13}$ poise.

In such method, since the molds can freely move in contact with the glass, following the contraction thereof, it is no longer necessary to precisely control the contraction in the course of cooling, and to use a prolonged cooling time after the press molding.

First embodiment

In the following there will be explained a first embodiment of the present invention, with reference to the attached drawings.

FIG. 1 is a schematic cross-sectional view of an embodiment of molds adapted for effecting the molding method of the present invention.

Figure 2:
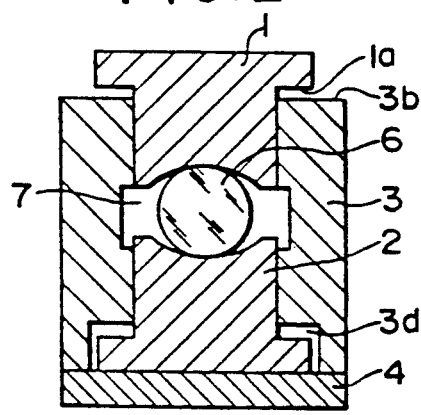
FIG. 2 is a schematic cross-sectional view of the molds shown in FIG. 1 prior to pressurizing.

FIG. 2 is a schematic cross-sectional view of the molds shown in FIG. 1, in a state prior to pressurizing.

Figure 3:
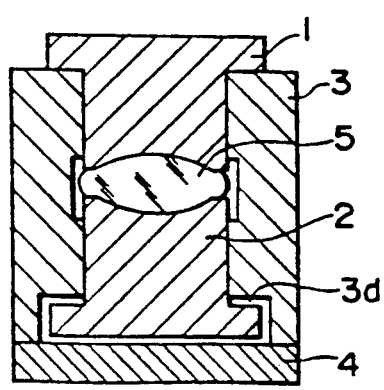
FIG. 3 is a schematic cross-sectional view of the molds shown in FIG. 1 in cooling after pressurizing.

FIG. 3 is a schematic cross-sectional view of the molds shown in FIG. 1, in a state of cooling after pressurizing.

Figure 4:
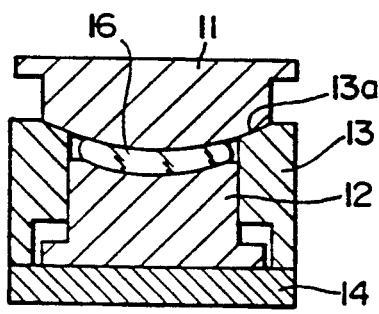
FIGS. 4 and 5 are schematic cross-sectional views of molds constituting a variation to the first embodiment.
Figure 5:
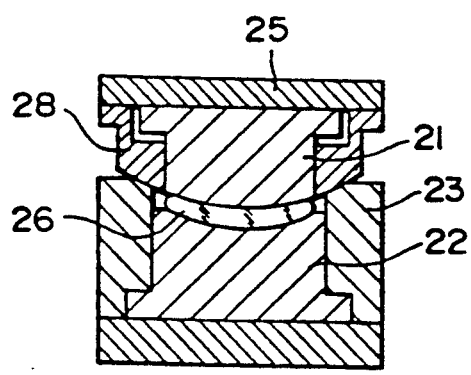

FIGS. 4 and 5 are schematic cross-sectional views of a variation of the molds of the present invention.

The molds of the present embodiment are composed of an upper mold 1 and a lower mold 2, slidably provided in a side mold 3 fixed on a plate 4. The upper mold 1 is provided with a flange 1a impinging on the upper end 3b of the side mold 3, while the lower mold 2 is provided with a flange 2a engaging, with a clearance 3d, in a groove 3c provided in the internal periphery of the side mold 3. Consequently, despite the pressing operation on the upper mold 1, the lower mold 2 can move in the axial direction of a molded glass 5 within the range of said clearance 3d. The thickness of the molded product is determined by the impingement of the flange 1a on the upper end 3b in the pressing operation. Said thickness can be made constant by employing a constant temperature at the pressing, since the amount of contraction by cooling becomes also constant. Also a slight fluctuation in the pressing temperature is permissible since it is sufficiently smaller than the temperature difference from the pressing to cooling.

In a state prior to pressing (FIG. 2), glass material 6 is placed on the lower mold 2 which is supported by the plate 4. In the press molding operation, an unrepresented rod driven by a cylinder is activated to move the upper mold 1 downwards. Thus the upper mold 1 slides in the side mold 3 until the flange 1a impinges on the upper end 3b of the side mold 3 to press the glass material 6. Whereby the upper mold 1 and the lower mold 2 are brought into contact with the faces of the glass material 6, thus achieving the transfer of form and defining the thickness of the molded article. The molded glass article 5 thus obtained is then cooled in the molds, showing contraction in said cooling. The thermal contraction of glass in a range from the molding temperature to the glass transition point is as high as $20 - 100 \times 10^6 /°C.$, which is about 10 times larger than that of the material constituting the molds. Thus, in the course of cooling, the glass contracts more than the molds and tends to be separated from the molds. However, since suitable adhesive force is generated at a high temperature between the glass and the molds, the lower mold 2 is lifted, following the contraction of glass. Thus the lower mold 2 moves upwards within the range of clearance 3d defined between the lower mold 2 and the side mold 3, and the molded article 5 is cooled in contact with the upper and lower molds 1, 2. Consequently the form of the molding faces of the upper and lower molds 1, 2 is precisely transferred to the molded article 5, of which thickness is defined constant by the distance between the upper and lower molds.

In the following there will be explained a specific example of forming an optical lens utilizing SF-8 as the glass material.

The internal diameter of the side mold 3 shown in FIG. 1 is finished with a concentricity of about 2 $\mu$m to minimize the aberration in the axes of the upper and lower molds 1, 2. Also the upper face 3b of the side mold 3 and the internal wall 3a thereof are finished with an error in perpendicularity not exceeding 10 seconds, and the lower face of the flange 1a of the upper mold 1 is finished with an error in perpendicularity to the axis of the upper mold 1 not exceeding 10 seconds, in order to obtain a lens with reduced optical eccentricity.

The glass SF-8 has a thermal expansion of $8.2 \times 10^{-6}/°C.$ in a temperature range of 100°-300° C., or $60 \times 10^{-6}/°$ C. around 560° C., and a deformation point of 470° C. and a softening point of 567° C. The lens has an outer diameter of 20 mm and a thickness of 2.5 mm. The molds 1, 2 are composed of an ultra hard alloy with a thermal expansion of $5 \times 10^{-6}/°$ C., and the side mold 3 and the plate 4 are composed of molybdenum with a thermal expansion of $5.6 \times 10^{-6}/°$ C. in a temperature range from 0° to 550° C.

The above-mentioned glass material was heated to 530° C. and is pressed for 5 minutes with a pressure of 100 kg in the above-explained molds. Subsequently the glass was cooled without the pressure and the molded article was taken out from the molds. The molded lens showed a precision of the faces as high as 0.1 $\mu$m.

FIG. 4 is a schematic cross-sectional view of a variation of the first embodiment.

The molds in said variation are composed of a plate 14 substantially the same as that in the foregoing embodiment, a side mold 13, an upper mold 11, and a lower mold 12 slidably along the internal periphery of the side mold 11. The upper mold 13 does not slide along the internal periphery of the side mold 13 as in the foregoing embodiment, but the perimeter of the molding face of said upper mold simply impinges on an upper end face 13a of the side mold 13.

Also in the present variation, the lower mold 12 adheres to the glass 16 and moves in the side mold 13, following the contraction of the glass in the cooling step after the press molding.

Another variation of the present invention will be explained in the following, with reference to FIG. 5.

In said variation, a lower mold 22 is fixed to a side mold 23, while an external support member 28 for an upper mold 21 impinges on the side mold 23, and the upper mold 21 is rendered slidable, along said external support member 28, in the axial direction of the molded article 26. The impinging face of the external support member 28 in contact with the side mold 23 is so constructed as to belong to a same spherical plane of the molding face of the upper mold 21 when it impinges on the plate 25. Thus the upper mold 21 and the side mold 23 are mutually centered by the mutual impingement thereof as in the foregoing embodiment, thereby ensuring the precision in the optical axis of the molded article 26. The fitting precision of the upper mold 21 and the external support member 28 is similar to that in the first embodiment.

At the press molding, the upper mold 21, which is slidable in the external support member 28, is pressed downwards while it is in contact with the plate 25, thereby molding the glass material 26. At the cooling, the molding face of the upper mold 21 remains in contact with the glass and moves together with the glass, following the contraction thereof.

Second embodiment

In the following there will be explained a second embodiment of the present invention, with reference to the attached drawings.

FIGS. 6(a) to (d) are cross-sectional views of press molds adapted for effecting the method of the present invention, and illustrate the steps of molding with said molds.

Said molds are composed of an upper mold 102 with a mirror-finished molding face 102a, a lower mold 103 with a mirror-finished molding face 103a, and an annular side mold 104 fixed on a base plate 103, wherein the lower mold 103 is fitted in the side mold 104 and rendered vertically slidable therein.

The upper mold 102 is provided, at the upper end of the external periphery thereof, with a flange 102b, which engages with a lifting handle 106 for lifting or lowering said upper mold 102.

The lower mold 103 is provided, at the lower end of the external periphery thereof, with an annular projection 103b, which engages with an annular recess 104b provided at the lower end of the internal periphery of the side mold 104 and having a vertical width slightly larger than that of said annular projection 103b of the lower mold 103, whereby the vertically movable distance of the lower mold 103 in the side mold 104 is defined.

A spring 107 is provided between the lower mold 103 and the base plate 108 for biasing the lower mold 103 upwards. In order to withstand the heat of the glass material 105a to be placed between the upper and lower molds, said spring 107 is preferably composed of a ceramic material such as partially stabilized zirconia, and can be composed as a coil spring or a plate spring. The biasing force of said spring 107 is so selected as to lift the lower mold 103 with the glass material 105a thereon, but to be weaker than the weight of the upper mold 102.

The press molding with the above-explained molds is conducted in the following manner. At first the molds are opened by lifting the upper mold 102 by means of the handle 106 (FIG. 6(a)), and the glass material 105a in softened state is placed on the lower mold 103. Then the upper mold 102 is placed on the glass material 105a by means of the lifting handle 106, and is pressed by a pressing rod 109 to transfer the form of the molding faces of the upper and lower molds 102, 103 to the glass material 105a sandwiched between said upper and lower molds (FIG. 6(b)). After sufficient form transfer, the entire molds are cooled.

Figure 6A:
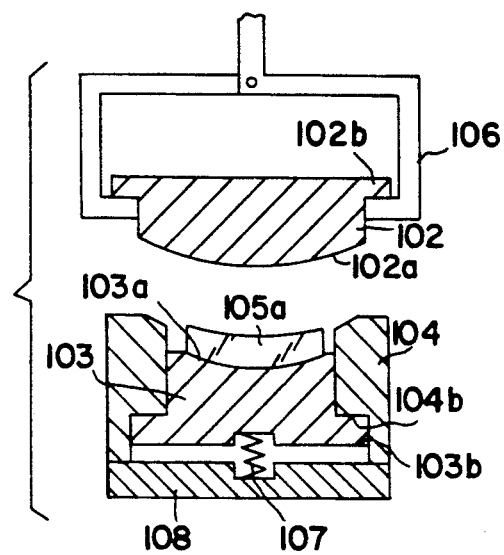
FIGS. 6(a) to (d) are cross-sectional views of press molds for effecting the molding method of the present invention, and illustrate the sequence of molding with said molds.
Figure 6B:
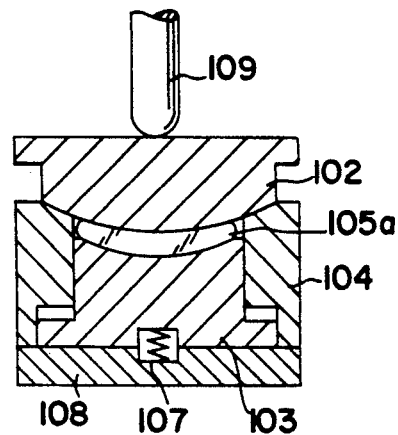

In the above-explained process, when the upper mold 102 is pressed by the pressing rod 109 as shown in FIG. 6(b), the lower mold 103 descends against the force of the spring 107 and is brought into contact with the base plate 108, whereby the press molding by the upper and lower molds is conducted. Subsequently the molded lens 105b is cooled by the cooling of the entire molds, and contracts more than the molds. Since the force of the spring 107 is stronger than the total weight of the lower mold 103 and the molded lens 105b but is weaker than the weight of the upper mold 102, said spring 107 forcedly lifts the lower mold 103 without lifting the upper mold 102, thus absorbing the volume contraction of the molded lens 106b and maintaining the molding faces 102a, 103a of the upper and lower molds in close contact with said molded lens. Thus the molded lens 105b is hardened with the form at the press molding.

The thickness of the molded lens 105b is determined in the state shown in FIG. 6(b). In a state shown in FIG. 6(c), the pressure by the spring 107 does not cause deformation, since the glass is already hardened and the spring force is relatively weak. Consequently the lens of a desired thickness can be obtained by suitably selecting the gap between the molding faces of the upper and lower molds 102, 103 in the state of FIG. 6(b), in consideration of the contraction thereafter.

Figure 6C:
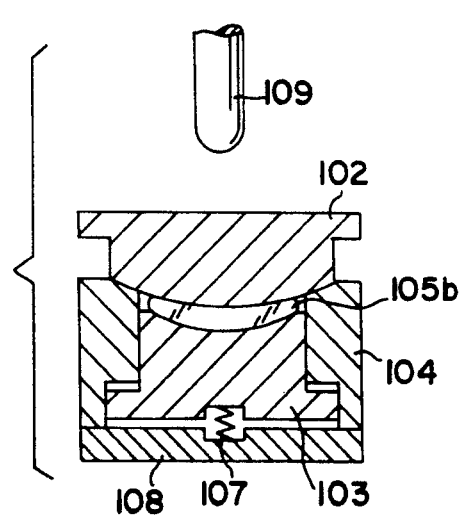
Figure 6D:
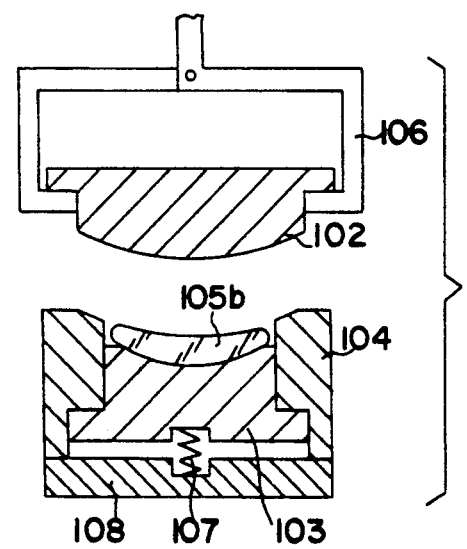

Then the molds are opened by lifting the upper mold 102 with the lifting handle 106 as shown in FIG. 6(d), and the molded lens 105b can be taken out for example with an unrepresented suction hand.

The above-explained molds are provided with the spring 107 between the lower mold 103 and the base plate 108 for biasing said lower mold 103 upwards, but such structure is not limitative. It is also possible, as shown in FIGS. 9(a) and (b), to bias the upper mold 142 downwards toward the glass material 145 by means of a spring 147, thereby obtaining similar effects.

In the molds shown in FIGS. 9(a) and (b), a lower mold 143 is fixed to a base plate 148, and the lower mold 103 and the side mold 104 shown in FIG. 6 correspond to an upper mold 142 and a guide member 146 engaging with said upper mold and guiding the vertical movement thereof. The spring 147 is provided between the upper mold 142 and said guide member 146 for providing said upper mold 142 with a downward biasing force. In said molds, the glass material 145 placed between the upper and lower molds is pressed by a pressing rod 149 acting on the guide member 146 as shown in FIG. 9(a), and, as shown in FIG. 9(b), the upper mold 142 is biased downwards by the spring 147 to absorb the contraction of the glass material 145 in the course of cooling.

In the following there will be explained a press molding apparatus in which the molds as shown in FIG. 6 are subjected to a heating step, a pressing step and a cooling step in continuous manner in a single molding chamber.

Figure 7:
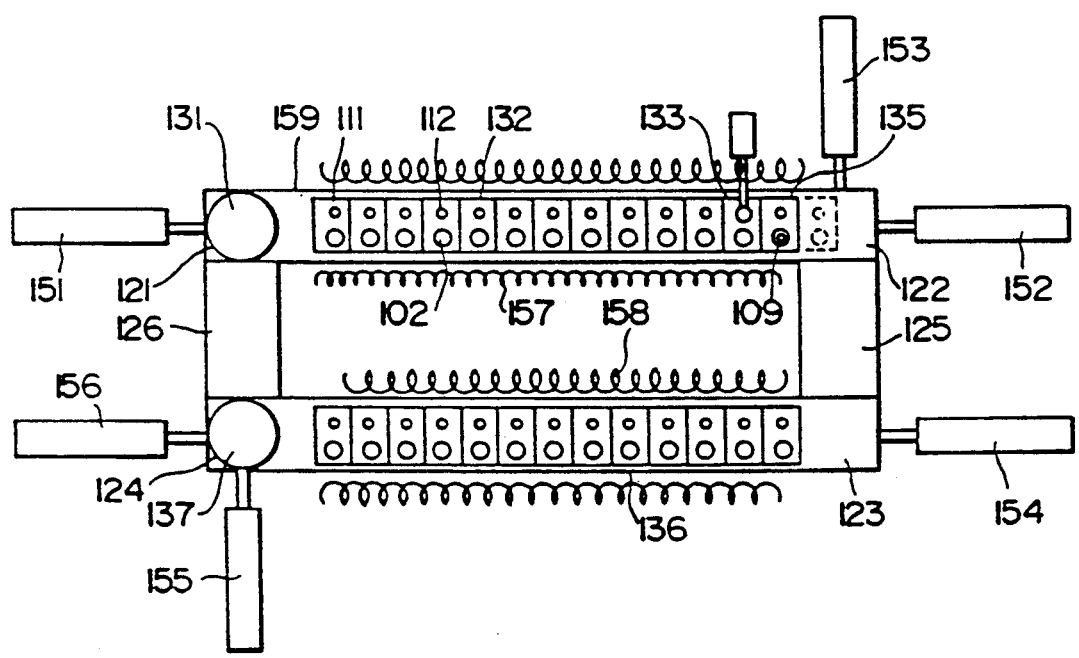

FIG. 7 is a schematic plan view of said apparatus, and FIGS. 8(a)-(f) are cross-sectional views showing the steps in various units of the apparatus shown in FIG. 7.

The press molding apparatus shown in FIG. 7 is composed of a material charging chamber 131, a heating unit 132, a material transfer unit 133, a pressing unit 135, a cooling unit 136 and a molded lens removing chamber 137. The material charging chamber 131, heating unit 132, material transfer unit 133 and pressing unit 135 are aligned along a same line, and the cooling unit 136 is positioned parallel thereto.

In the vicinity of entrance of the heating unit 132 there is provided a first transfer chamber 121 in which the above-mentioned material charging chamber 131 is provided. In the vicinity of the exit of the pressing unit 135, there is provided a second transfer chamber 122, which is connected by a transfer path 125 to a third transfer chamber 123 provided at the entrance of the cooling unit 136. In the vicinity of the exit of the cooling unit 136 there is provided a fourth transfer chamber 124 in which the above-mentioned molded lens removing chamber 137 is located and which is connected by a transfer path 126 with said first transfer chamber 121. The above-explained structure constitutes a continuous molding chamber 159.

Figure 8A:
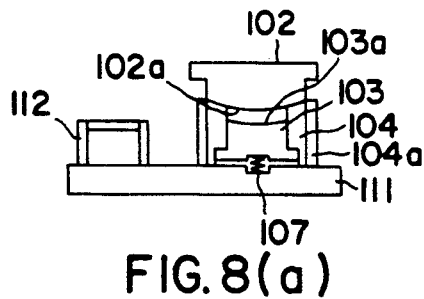
FIGS. 8(a) to (f) are cross-sectional views showing steps of the molding method in various units of the apparatus shown in FIG. 7.

A pallet 111, to be transferred in said molding chamber 159, is equipped with molds, composed of an upper mold 102, a lower mold 103, a side mold 104 and a spring 107 for pushing said lower mold upwards in said side mold, as shown in FIG. 6, and a material support table 112 spaced by a predetermined distance from said molds (cf. FIG. 8(a)).

In the present example, the upper mold 102 and the lower mold 103 are composed of an ultra hard alloy of respective weights of 600 g and 200 g, while the spring 107 is of a spring force of 500 g, and the pressing rod 109 exerts a pressing force of 150 kg.

For moving the pallets 111 in said molding chamber, the first transfer chamber 121 is provided with a pushing cylinder 151, by means of which the pallet 111 is transferred to the pressing unit 135. The second transfer chamber 122 is provided with a pulling cylinder 152 and a pushing cylinder 153. The pulling cylinder 152 moves the pallet 111 from the pressing unit 135 to the second transfer chamber 122, and the pushing cylinder 153 moves the pallet from said second transfer chamber to the third transfer chamber 123. Said third transfer chamber 123 is provided with a pushing cylinder 154, which moves the pallet 111 from said third transfer chamber 123 to a position immediately in front of the fourth transfer chamber 124, which is equipped with a pulling cylinder 156 and a pushing cylinder 155. Said pulling cylinder 156 moves the first pallet 111 in the position just in front of the fourth transfer chamber 124 to said fourth transfer chamber 124, and the pushing cylinder 155 moves the pallet 111 from said fourth transfer chamber 124 to the first transfer chamber 121. In this manner each pallet 111 circulates in the various steps in the molding chamber 159, by the functions of said pulling and pushing cylinders.

Each pallet 111 is placed on unrepresented rails provided in the molding chamber 159, and moves on said rails by engagement, on lateral faces, with the end of rod of each cylinder.

In the following there will be given an explanation on the various units of said molding chamber 159 and on the function of the apparatus with reference to FIGS. 8(a)-(f).

In the heating unit 132, material transfer unit 133 and pressing unit 135 of the molding chamber 159, there is provided a heater 157, and the cooling unit 136 is provided with a heater 158, and said heaters are used for heating the glass material 105a and gradually cooling the molded lens 105b.

Figure 8B:
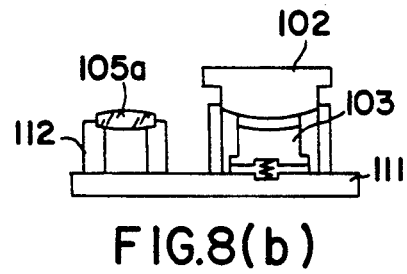

In order to prevent the oxidation of the upper and lower molds 102, 103, the molding chamber 159 is evacuated to a pressure of $1 \times 10^{-2}$ Torr by means of an unrepresented vacuum pump, and is filled with nitrogen or other non-oxidative gas. Then the heaters 127, 128 are energized to heat the chamber to predetermined temperatures. Then, in the material charging chamber 131, the glass material 105a is placed on the support table 112 of a pallet 111 positioned in said chamber 131 as shown in FIG. 8(b), by means of an unrepresented finger, through the replaced atmosphere as explained above.

Then the pushing cylinders 151, 153, 154, 155 and the pulling cylinders 152, 156 are activated, and the glass material 105a is placed on the support table 112 of each pallet 111 and transferred from the removing chamber 137 to the material charging chamber 131. Through the repetition of these operations, the material 105a, upper mold 102 and lower mold 103 of the first pallet are heated to a temperature required for press molding, at a position in the vicinity of the material transfer unit 133. The material 105a, upper mold 102 and lower mold 103 are preferably heated to substantially equal temperatures, since the press molding can be conducted under optimum conditions without the change in temperature of the material 105a after transfer thereof.

Figure 8C:
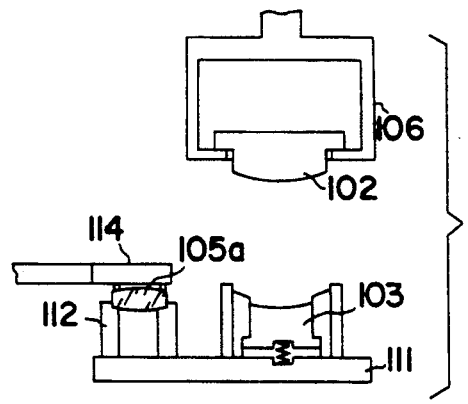
Figure 8D:
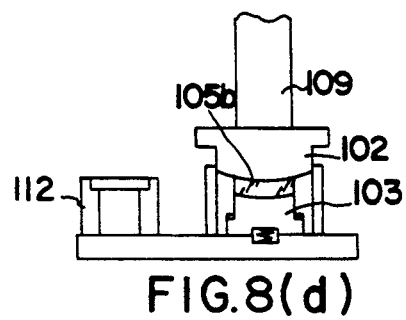
Figure 8E:
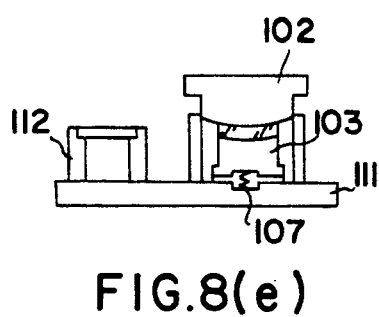

Then, as shown in FIG. 8(c), the upper mold 102 is lifted by the lifting handle 106 in the material transfer unit 133, and the material 105a is transferred onto the lower mold 103 by means of the suction finger 114 (corresponding to FIG. 6(a)). Subsequently the pushing cylinder 151 is activated to move the pallet 111, in which the material transfer is completed, to the pressing unit 135. Then, as shown in FIG. 8(d), the pressing rod 109 is activated to press the upper mold 102 with the predetermined pressure, thereby molding the material 105a (a state corresponding to FIG. 6(b)). In this state, the lower mold 103 reaches the pallet 111 against the force of the spring 107, whereby the glass material 105a is subjected to molding by the molding faces 102a, 103a of the upper and lower molds.

Then the pressing rod 109 is released, and the pallet 111 is moved from the pressing unit 135 to the second transfer chamber 122, with the upper mold remaining in the pressed state. Said pallet 111 is then further transferred to the third transfer chamber 123 through the transfer path 125. Then the pallet 111 is transferred to the cooling unit in which preceding pallets are already aligned. Thus, while the pallet 111 reaches the exit of the cooling unit by the repetition of the above-explained operations, the molded lens 105b supported between the upper and lower molds 102, 103 is gradually cooled (FIG. 8(e)).

In the course of said gradual cooling, the lower mold 103 is forcedly pushed upwards by the spring 107, following the contraction of the molded lens 105b as already shown in FIG. 6(c), whereby the molded lens 105b is hardened in close contact with the molding faces 102a, 103a of the upper and lower molds.

The pallet 111 advanced to the frontmost position of the cooling unit 136 is then transferred to the molded lens removing chamber 137 by the pulling cylinder 156.

Figure 8F:
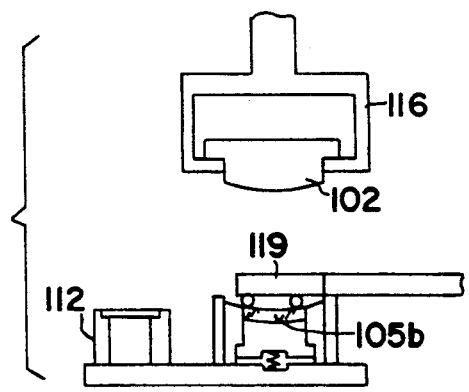
Figure 11:
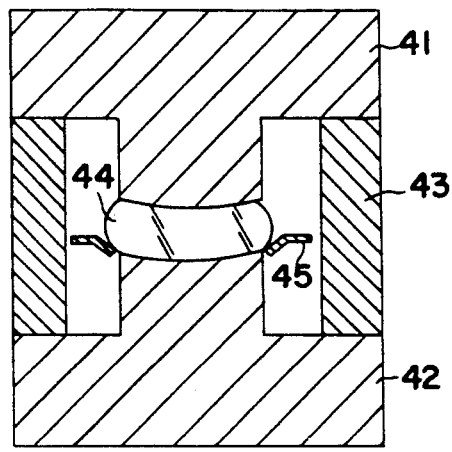
FIG. 11 is a cross-sectional view of another mold structure different from that shown in FIG. 10.
Figure 12:
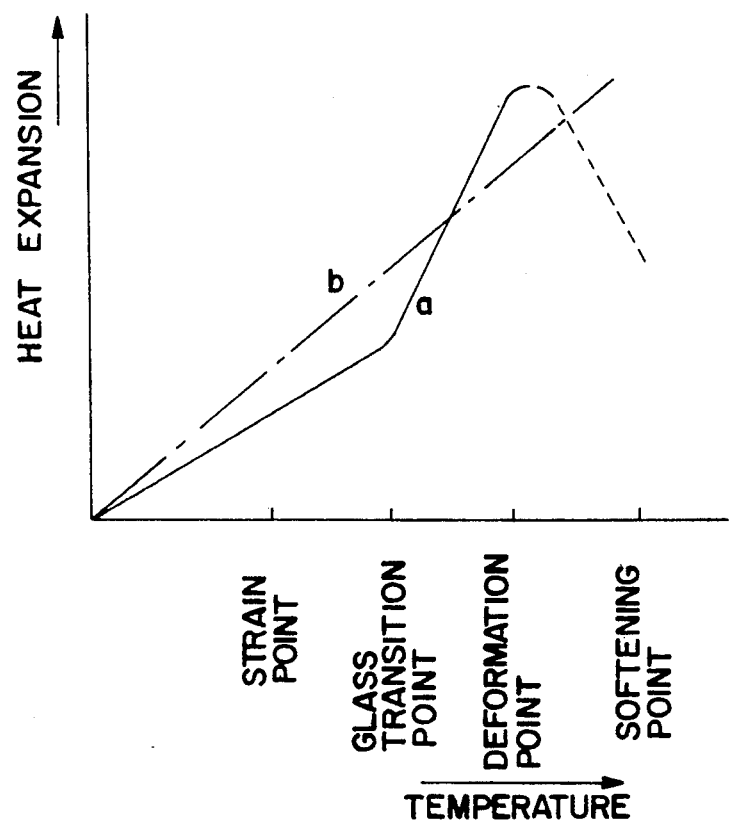
FIG. 12 is a chart showing thermal expansion of glass.

In said removing chamber, as shown in FIG. 8(f), the molds are opened by lifting the upper mold 102 by the lifting handle 116, and the molded lens 105b is removed by the suction hand 119 (a state corresponding to FIG. 6(d)).

After said removal of the molded lens 105b, the pallet 111 is transferred by the pushing cylinder 155 from the removing chamber 137 to the material charging chamber 131 through the transfer path 126, whereby the press molding is conducted in continuous manner through the same steps as explained above.

As explained above, the present invention is easily applicable to a molding line for effecting the press molding in continuous manner.

The above-explained press molding apparatus provides an additional advantage that the service life of the molds is extended due to the absence of reaction between the material 105a and the molds 102, 104, since the glass material 105a is placed on the support table 112 and is separated from the upper and lower molds 102, 103 until immediately before the press molding.

Also since the transfer of the glass material is effected on the same pallet, there is no change in the relative position between the support table 112 and the molds, so that the precise positioning of the suction finger 114 is easily achievable. Also since the suction finger 114 is heated together with the pallet 111 in the molding chamber 159, the error in positioning of the suction finger due to thermal expansion can be prevented.

In addition, the service life of the molds can be ensured as explained above, and the mirror finish of the molding faces can be maintained for a relative long period due to the absence of corrosion of the molding faces, so that continuous manufacture of high precision glass elements can be easily achieved.

As explained in the foregoing, the present invention provides a biasing force so as to reduce the distance between the upper and lower molds, following the contraction of glass material in the cooling thereof after press molding, whereby the molding faces of the upper and lower molds move in contact with the functional faces of the glass material despite the contraction of the glass material. Therefore the molding faces of said molds are maintained always in close contact with said functional faces, and the glass material solidifies, maintaining the molded form.

Consequently the present invention allows the glass material to cool while maintaining close contact with the molding faces of the upper and lower molds, regardless of the amount of contraction of said glass material in the course of cooling.

Also, different from the conventional molds employing a spacer, the present invention biases the upper or lower mold following the contraction of the glass material, thereby properly responding to the gradually increasing contraction of the glass material.

Furthermore, the present invention absorbs surface defects such as uneven partial contraction in the surfaces of the glass material by means of the biasing force provided to the upper or lower molds, so that the glass material is cooled and solidifies according to the form of the molding faces. Thus the highly precise molded lens obtained in the press molding can be maintained and fixed.

Due to the foregoing reasons, the molded glass article obtained according to the present invention is suitable for an optical element requiring a highly precise surface form, such as an optical lens.

Also in the molding apparatus of the second embodiment, a biasing force is given to the upper or lower mold to follow the contraction of glass material in the course of cooling so as to reduce the volume of cavity defined by the upper, lower and side molds, so that the molding faces of the upper and lower molds follow the functional faces of the glass material according to the contraction thereof. Consequently, in the course of cooling after the molding, the molding faces of the upper and lower molds are always maintained in close contact with the functional faces of the glass material, so that the glass material in the molds solidified and fixes the form obtained in the molding operation.

The above-mentioned contraction of glass material resulting from cooling may not be uniform but can occur unevenly due to temperature distribution in the molds. However, according to the present invention, the entire surfaces of the glass material can be uniformly pressed by the molding faces of the upper and lower molds by the biasing force supplied to either of said molds, whereby the eventual partial contraction of the glass material can also be absorbed by said molding faces.

What is claimed is:

1. A method for molding an optical element, comprising the steps of:
   disposing an upper mold and a lower mold for forming optical functional surfaces of the optical element and a side mold for guiding the upper and lower molds;
   coupling the upper mold, the lower mold and the side mold together so the side mold can guide the upper and lower molds in an axial direction;
   forming a gap between either the upper mold or the lower mold and the side mold to allow axial movement of the upper mold and the lower mold relative to the side mold;
   inserting a glass material between the upper and lower molds;
   heating at least the upper and lower molds and glass material to a predetermined temperature;
   pressing the glass material between the upper and lower molds such that an adhesive force results between the glass material and the upper and lower molds;
   cooling at least the press-molded glass material, while the adhesive force causes one of the upper and lower molds to move toward the glass material in the axial direction within the gap; and
   limiting the movement of either the upper mold or lower mold which is moving in the axial direction which movement is caused by said adhesive force, so as to thereby control the thickness of the molded glass material.

2. A molding method according to claim 1, wherein the upper or lower mold moves when the glass material is in a viscosity range of from $10^9$ to $10^{13}$ poise.

3. A method for molding an optical element, comprising the steps of:
   disposing an upper mold and a lower mold for forming optical functional surfaces of the optical element and a side mold for guiding the upper and lower molds;
   forming a gap between the lower mold and the side mold;
   inserting a glass material between the upper mold and the lower mold;
   heating the upper mold, the lower mold and the glass material to a predetermined temperature;
   pressing the glass material between the upper and lower molds by applying pressure to the upper mold such that an adhesive force results between the glass material and the lower mold;
   cooling the molded glass article, while the adhesive force causes a movement of the lower mold toward the glass article in an axial direction which follows a shrinkage of the molded glass article; and
   limiting the movement of the lower mold in the axial direction within the gap which movement is caused by said adhesive force so as thereby control the thickness of the molded glass.

4. A method for molding an optical element, comprising the steps of:
   disposing an upper mold, a lower mold and a side mold for forming optical functional surface of the optical element, with the side mold supporting at least the lower mold;
   forming a gap between the upper mold and the side mold;
   inserting a glass material between the upper mold and the lower mold;
   heating the upper mold, the lower mold, and the glass material to a predetermined temperature;
   pressing the glass material between the lower mold, which is held at a fixed position, and the upper mold, which is moved in an axial direction by applying pressure to the upper mold such that an adhesive force results between the glass material and the upper mold;
   cooling the molded glass article while the adhesive force causes a movement of the upper mold toward the glass article in the axial direction which follows a shrinkage of said molded glass article; and limiting them movement of the upper mold in the axial direction within the gap which movement is caused by said adhesive force so as to thereby control the thickness of the molded glass.

5. A method for molding an optical element, comprising the steps of:

preparing a forming mold having an upper mold with an optical functional surface and a flange portion to be impinged against a side mold, a lower mold having an optical functional surface and a flange portion, a side mold having a guide portion for guiding the upper and lower molds, and a bottom plate for retaining the lower mold, wherein the upper and lower molds are fitted into the side mold so that a center axial line of the upper and lower molds aligns with a center axial line of the guide portion of the side mold, and movement of the upper and lower molds in an axial direction is regulated by the guide portion of the side mold, with the side mold including upper and lower surfaces arranged so as to be perpendicular to the center axial line of the guide portion, with the upper surface being capable of contacting the flange portion of the upper mold and the lower surfaced being capable of contacting the bottom plate, with the flange portion of the upper mold having a lower surface capable of contacting the side mold and the lower mold having a lower surface capable of contacting the bottom plate and being arranged so as to be perpendicular to the center axial line of the guide portion of the side mold, wherein a gap is formed between an upper surface of the flange portion of the lower mold and the side mold when the lower mold contacts the bottom plate, with a dimension and accuracy of each mold being structured so that when the molds contact each other, a cavity shape is formed between the upper and lower molds and substantially corresponds to a predetermined shape of the optical element, the cavity shape being corrected according to a variation of mold shape due to difference of thermal expansions of each mold;

heating the forming mold and a glass material;

positioning the glass material between the upper and lower molds of the forming mold until the forming mold and the glass material reach a moldable temperature, pressing the upper mold to allow the lower surface of the flange portion of the upper mold to contact the upper surface of the side mold to mold the glass material to the cavity shape formed between the upper and lower molds, such that an adhesive force results between the glass material and the lower mold;

cooling the forming mold and the resulting molded glass product while the adhesive force causes a movement of the lower mold in the axial direction and toward the glass; and limiting said movement of the lower mold in the direction within the gap between the lower mold and the side mold which movement is caused by said adhesive force so as to thereby control the thickness of the molded glass product as it contracts.

6. A method according to claim 5, wherein the upper surface of the flange portion of the lower mold impinges against the side mold during cooling to limit axial movement of the lower mold during cooling.

7. A method according to claim 5, wherein the limiting step is performed in a state when a viscosity of the glass material is between $10^9$ and $10^{13}$ poise.

* * * * *

UNITED STATES PATENT AND TRADEMARK OFFICE
CERTIFICATE OF CORRECTION

PATENT NO. : 5,173,100

DATED : December 22, 1992

INVENTOR(S) : Isamu Shigyo, et al.

It is certified that error appears in the above-identified patent and that said Letters Patent is hereby corrected as shown below:

On the title page:

[56] REFERENCES CITED:

Insert:   --OTHER DOCUMENTS
                Black, H.C., Black's Law Dictionary, 1979,
                p. 728.--.

COLUMN 1:

Line 21, "18" should read --is--.

COLUMN 2:

Line 9, "contacting" should read --contrasting--.
   Line 34, "molds 76, 77" should read --molds 71, 72--.

COLUMN 6:

Line 31, "mold 11." should read --mold 13.-- and "mold 13" should read --mold 11--.

COLUMN 7:

Line 8, "base plate 103," should read --base plate 108,--.
   Line 65, "FIG. 6(b)." should read --FIG. 6(c).--.

COLUMN 9:

Line 11, "pallet" should read --pallet 111--.

UNITED STATES PATENT AND TRADEMARK OFFICE
CERTIFICATE OF CORRECTION

PATENT NO. : 5,173,100
DATED : December 22, 1992
INVENTOR(S) : Isamu Shigyo, et al.

It is certified that error appears in the above-identified patent and that said Letters Patent is hereby corrected as shown below:

COLUMN 12:

Line 50, "surface" should read --surfaces--.

COLUMN 13:

Line 1, "them" should read --the--.
Line 24, "surfaced" should read --surface--.

COLUMN 14:

Line 24, "direction" should read --axial direction--.

Signed and Sealed this

Fifteenth Day of March, 1994

Attest:

BRUCE LEHMAN

*Attesting Officer*    *Commissioner of Patents and Trademarks*